(12) United States Patent
Azuma

(10) Patent No.: US 10,177,973 B2
(45) Date of Patent: Jan. 8, 2019

(54) COMMUNICATION APPARATUS, COMMUNICATION METHOD, AND COMMUNICATION SYSTEM

(71) Applicant: Yoshikazu Azuma, Tokyo (JP)

(72) Inventor: Yoshikazu Azuma, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 66 days.

(21) Appl. No.: 15/305,852

(22) PCT Filed: Apr. 16, 2015

(86) PCT No.: PCT/JP2015/062317
§ 371 (c)(1),
(2) Date: Oct. 21, 2016

(87) PCT Pub. No.: WO2015/186450
PCT Pub. Date: Dec. 10, 2015

(65) Prior Publication Data
US 2017/0048103 A1 Feb. 16, 2017

(30) Foreign Application Priority Data

Jun. 3, 2014 (JP) .................................. 2014-114860
Dec. 22, 2014 (JP) .................................. 2014-258316

(51) Int. Cl.
*H04L 12/24* (2006.01)
*H04L 12/64* (2006.01)
(Continued)

(52) U.S. Cl.
CPC ...... *H04L 41/0803* (2013.01); *H04L 12/4633* (2013.01); *H04L 12/6418* (2013.01); *H04L 41/0889* (2013.01); *H04L 49/70* (2013.01)

(58) Field of Classification Search
CPC .................................................. H04L 41/0803
(Continued)

(56) References Cited

U.S. PATENT DOCUMENTS

2010/0298023 A1 11/2010 Jacobsohn et al.
2012/0170477 A1* 7/2012 Hieda .................. H04L 45/586
370/252
(Continued)

FOREIGN PATENT DOCUMENTS

JP 2015-041373 3/2015
KR 10-2011-0097490 8/2011
(Continued)

OTHER PUBLICATIONS

International Search Report dated Jul. 14, 2015 in PCT/JP2015/062317 filed on Apr. 16, 2015.
(Continued)

*Primary Examiner* — Samina F Choudhry
(74) *Attorney, Agent, or Firm* — Cooper & Dunham LLP

(57) ABSTRACT

A communication apparatus which communicates with one or more other communication apparatuses via a network, includes: one or more communication interfaces being used for communication with the one or more other communication terminals; a selection unit connected to the one or more communication interfaces and selecting at least one communication interface that is used in accordance with an instruction from a control device which controls communications; and a network establish unit establishing a virtual network by forming a virtual communication path which directly connects between the at least one communication interface selected by the selection unit and a communication interface included in at least one communication apparatus among the one or more other communication apparatuses.

19 Claims, 10 Drawing Sheets

(51) Int. Cl.
H04L 12/46 (2006.01)
H04L 12/931 (2013.01)

(58) Field of Classification Search
USPC .......................................................... 370/254
See application file for complete search history.

(56) References Cited

U.S. PATENT DOCUMENTS

| 2013/0044641 A1* | 2/2013 | Koponen ............... H04L 12/66 370/255 |
| 2013/0201978 A1 | 8/2013 | Iyer et al. |
| 2013/0201979 A1 | 8/2013 | Iyer et al. |
| 2015/0054968 A1 | 2/2015 | Murata |
| 2015/0172925 A1 | 6/2015 | Leppanen et al. |
| 2017/0163570 A1 | 6/2017 | Casado et al. |

FOREIGN PATENT DOCUMENTS

| KR | 10-2012-0016080 | 2/2012 |
| WO | 2013/160526 A1 | 10/2013 |
| WO | 2014/038135 | 3/2014 |

OTHER PUBLICATIONS

Ryota Kawashima, 'vNFC: A Virtual Networking Function Container for SDN-enabled Virtual Networks' In: Proceedings IEEE Second Symposium on Network Cloud Computing and Applications-NCCA2012-, pp. 124-129, [online], IEEE, Dec. 2012, [retrieved on Jul. 6, 2015], Retrieved from the Internet <URL: http://ieeexplore.ieee.org/xpls/abs—all.jsp?arnumber=6472468>.

"Why not study network ? Cisco CCNA/CCNP/CCIE, best to study for the network specialist test—wireless LAN, a scheme of wireless LAN part 3", [on-line], Aug. 4, 2007, the Internet <URL: http//www.n-study.com/network/2007/08/lan_lan_3_1.html>.

European search report dated Jun. 23, 2017 in connection with corresponding European patent application No. 15803851.3.

Korean official action (and English translation thereof) dated Feb. 5, 2018 in connection with corresponding Korean patent application No. 10-2016-7033104.

* cited by examiner

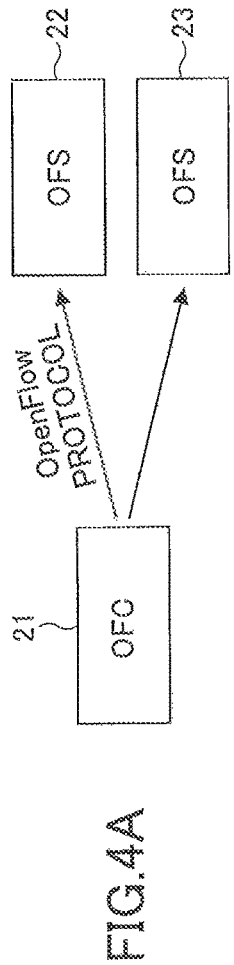
FIG.4A
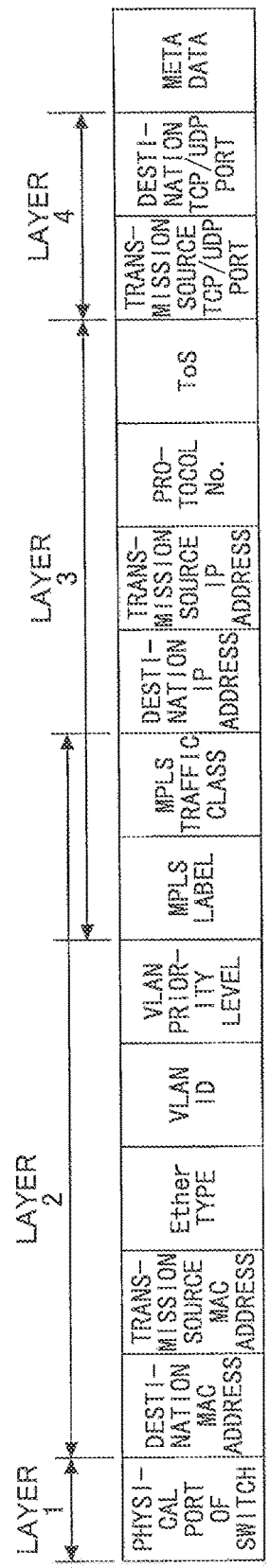
FIG.4B
FIG.4C

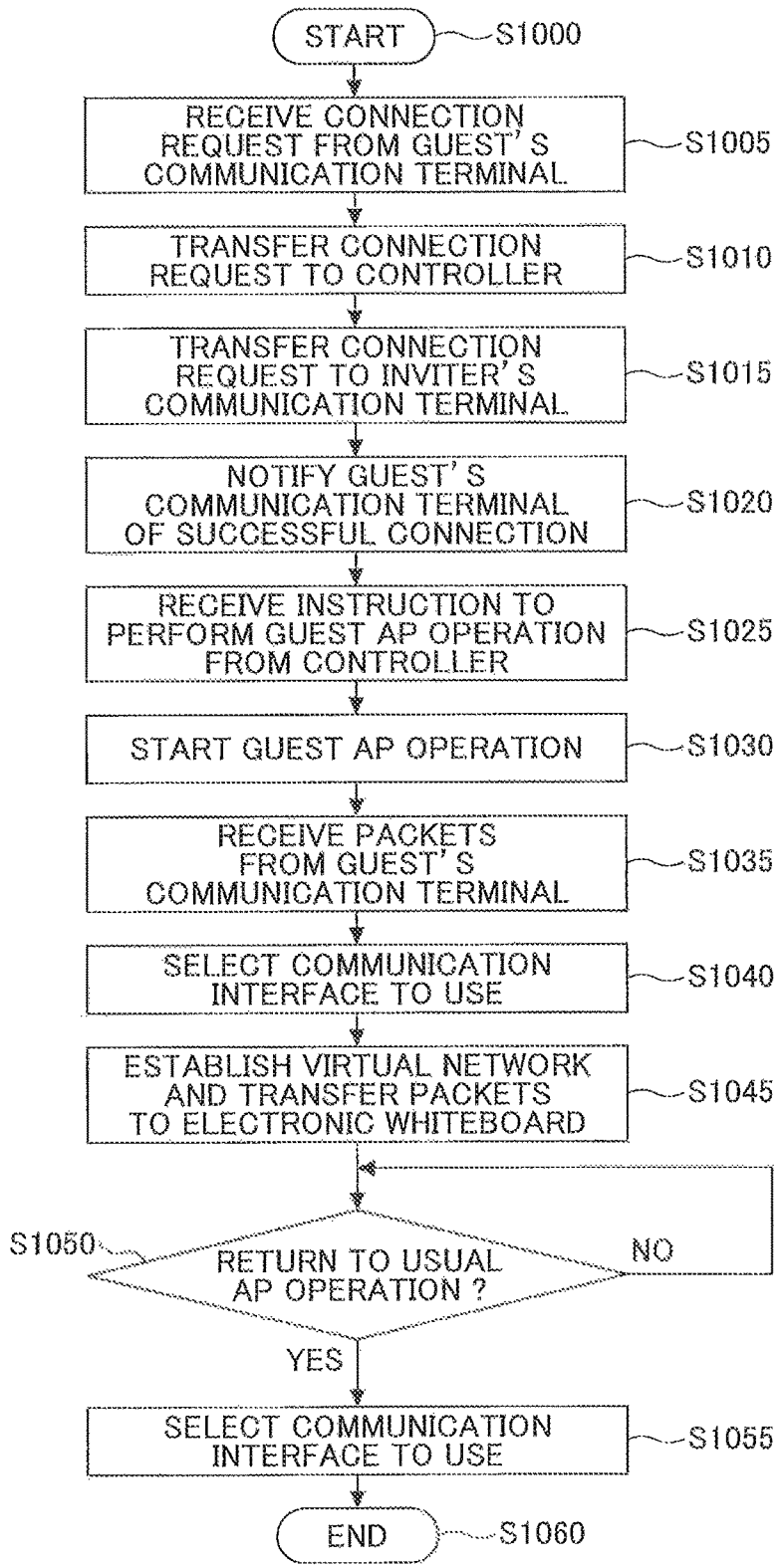

COMMUNICATION APPARATUS, COMMUNICATION METHOD, AND COMMUNICATION SYSTEM

TECHNICAL FIELD

The present invention relates to a communication apparatus which communicates with one or more other communication apparatuses via a network, a communication method thereof, and a communication system including the communication apparatus.

BACKGROUND ART

With development of wireless communication techniques and with wide use of mobile terminals, wireless communications are generally used as the communications among electronic devices such as a mobile-type terminal, an electronic whiteboard, a projector, etc. The wireless communications are performed with an access point (base station) which serves as an entrance to a network. Due to the characteristics of the wireless communications, the wireless communications can be performed through, for example, a wall. Therefore, security in wireless communications is more enhanced than in wired communications. In wireless communications, when a terminal is connected to an access point, the terminal is authenticated. Further, during wireless communications, encrypted packet data are transmitted and received. In some companies, etc., in order to further enhance the security, it is arranged that only a terminal whose MAC address is registered in advance can connect to an access point.

However, when such authentication is necessary and only a terminal which is registered in advance, business readiness and flexibility may be reduced. As one example, there may be case when a guest having a smartphone or a tablet PC is invited into a conference room to exchange information or perform a discussion using such an electronic device, the electronic device cannot be connected and used in the conference room, so that the functions of the electronic device cannot be used sufficiently.

In an access point, it is possible to set a plurality of identification information, which is called a Service Set Identifier (SSID), to identify the access point, so that it is possible to independently set an authentication scheme and security settings on the SSID basis (see, for example, Non-patent Document 1). By using this, it becomes possible to establish an SSID for internal use and an SSID for guests, so that an enhanced security setting is done for the SSID for internal use and no security setting is done for the SSID for guests. As a result, it becomes possible to connect a terminal of a guest and use the functions of the terminal.

SUMMARY OF THE INVENTION

Problems to be Solved by the Invention

In the above related-art technique, however, it is bothersome to establish the SSID for a guest and set the security setting for the SSID whenever necessary. Further, in the communication path, various devices exist such as a relay device, a dedicated device, etc. Therefore, it is necessary to check those devices when the security setting is done. As a result, it is difficult to promptly prepare for when a guest comes. Due to this, it is necessary to prepare two networks, which are a network to be used usually ("usual network") and a network for guests ("guest network"), on a steady basis.

Further, in the above technique, it is not possible to flexibly and easily add a device which a terminal of a guest can access in the communications. Therefore, the use efficiency is lowered due to the preparation of the guest network on a steady basis, and the device that a guest can use is fixed so that the flexibility is limited.

Therefore, it is desired to provide an apparatus, a method, etc., capable of providing a guest network that can be flexibly controlled with a higher use efficiency than that in a related-art technology.

Means for Solving the Problems

The present invention is made in light of the above problem, and according to an embodiment, a communication apparatus which communicates with one or more other communication apparatuses via a network, includes: one or more communication interfaces being used for communication with the one or more other communication terminals; a selection unit connected to the one or more communication interfaces and selecting at least one communication interface that is used in accordance with an instruction from a control device which controls communications; and a network establish unit establishing a virtual network by forming a virtual communication path which directly connects between the at least one communication interface selected by the selection unit and a communication interface included in at least one communication apparatus among the one or more other communication apparatuses.

Effects of the Present Invention

According to an aspect of the present invention, it becomes possible to provide a guest network that can be flexibly controlled with a higher use efficiency.

BRIEF DESCRIPTION OF THE DRAWINGS

FIG. 4A is a drawing illustrating an example configuration of the "OpenFlow Switching" that can be implemented in the communication apparatus;

FIG. 4B is a drawing illustrating an example of a flow table;

FIG. 4C is a drawing illustrating an example field used in the "OpenFlow Switching";

FIG. 10 is a flowchart of example processes performed by an access point serving as the communication apparatus of FIG. 9.

BEST MODE FOR CARRYING OUT THE INVENTION

Figure 1:
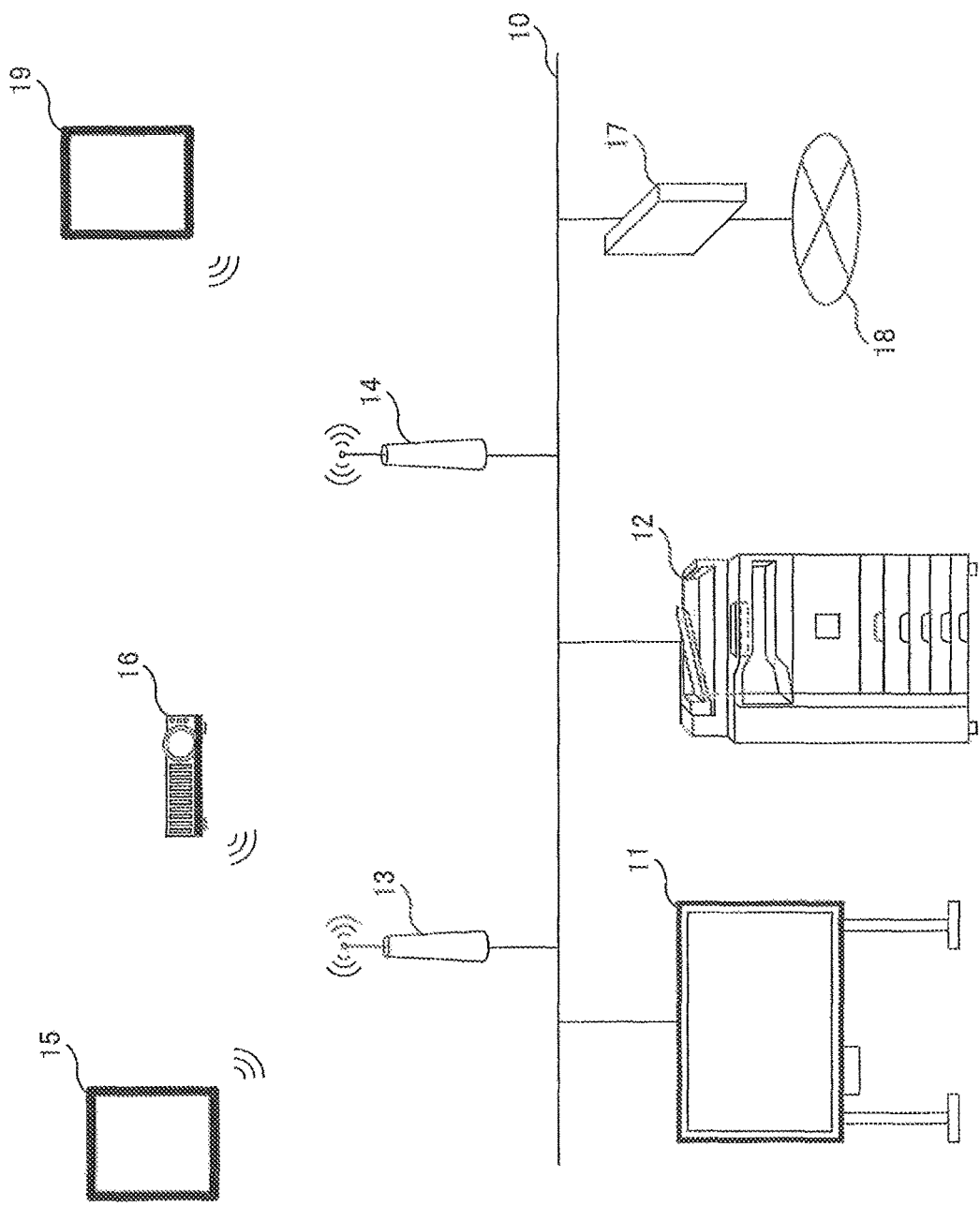
FIG. 1 is a drawing illustrating an example configuration of a communication system including a communication apparatus according to an embodiment.

FIG. 1 is a drawing illustrating an example configuration of a communication system including a communication apparatus according to an embodiment. The communication system includes an electronic whiteboard 11, a Multi Function Peripheral (MFP) 12, and two access points 13 and 14, which are connected to a wired Local Area Network (LAN) 10 as a wired network. The communication system further includes a communication terminal 15 and a projector 16, which communicate with the access points 13 and 14. Further, the communication system is connected to the Internet 18 via a firewall 17 which serves as a limiting means for limiting access. To the Internet 18, various servers, such as a content server, a personal computer (PC), etc., are connected. In FIG. 1, a case is illustrated where the communication terminals 15 and 19 are tablet PCs. However, the communication terminals 15 and 19 may be, for example, a laptop PC, a smartphone or the like.

The communication system includes one of the apparatuses (devices) as a "communication apparatus" and the apparatuses other than the "communication apparatus" as "(one or more) other communication apparatuses". As one example, it is possible that the access point 13 is the "communication apparatus" and other apparatuses such as the electronic whiteboard 11, the MFP 12, etc., are the "other communication apparatuses". Note that the apparatus configuration of the communication system is not limited to the example configuration of FIG. 1. Namely, the communication system may have any other configuration. Accordingly, for example, the communication system may include two or more wired LANs which are connected via a relay apparatus such as a router, or may include other apparatuses such as a digital camera, a game machine, a PC, a server, etc. In order for the communication terminal 15 and the projector 16 to wirelessly communicate with the access points 13 and 14, authentication information such as the SSID or Extended SSID (ESSID), a password, etc encryption information such as an encryption key for encrypted transmission and reception, etc., are registered in advance. Further, the authentication information, etc., are registered in the access points 13 and 14. The wireless communications start after a beacon, which includes the SSID or the ESSID transmitted periodically from the access points 13 and 14, is received by the communication terminal 15 or the like and the communication terminal 15 or the like sends a connection request called an "association request" so that the connections are successful. The authentication information is transmitted before the association request is transmitted, and the association request is from the communication terminal 15 or the like after the authentication is successful. A connection method to connect to the access points 13 and 14 in the wireless communications is well-known. Therefore, the description thereof is herein omitted.

After the connection to the access point 13 is successful, the communication terminal 15 and the projector 16 can access, via the access point 13, the electronic whiteboard 11, the MFP 12, the Internet 18, etc., which are connected to the wired LAN 10. For example, the communication terminal 15 can transmit print data to the MFP 12 via the access point 13, and cause the MFP 12 to print. Further, the communication terminal 15 can transmit the screen data displayed on the display to the electronic whiteboard 11 via the access point 13, so as to be displayed on a display screen of the electronic whiteboard 11.

The communication terminal 19 is a terminal owned by a guest, and the authentication information, etc., of the communication terminal 19 are not registered in advance. Because of having the functions to perform wireless communications, it is possible for the communication terminal 19 to receive the beacon from the access points 13 and 14, acquire the SSID or the ESSID, and attempt to connect to the access points 13 and 14. However, the authentication information, etc., are not registered. Therefore, usually, the communication terminal 19 cannot connect to the access points 13 and 14. Accordingly, it is also not possible for the communication terminal 19 to access the electronic whiteboard 11, the MFP 12, etc.

In the communication system of FIG. 1, it is arranged such that a virtual network can be adequately established on the usual network which has been already established by the wired LAN 10 and a wireless LAN, so that a guest can easily connect to the virtual network. Therefore, it is possible to connect to the virtual network and use the apparatuses on the usual network even when the authentication information, etc., are not registered in advance like the communication terminal 19. Due to this arrangement, it is no longer necessary to separately prepare the guest network on a steady basis, thereby realizing higher use efficiency. Further, it is possible to limit and add the apparatuses that are to be included in the guest network when the virtual network is established as the guest network, thereby enabling realizing the establishment of the guest network which can be flexibly controlled.

As an authentication scheme and a connection method for a guest, any appropriate scheme or method may be used. For example, it is possible to use a Wi-Fi Protected Setup (WPS), a Web Captive Portal, etc. The former is a scheme to easily perform connection of wireless LAN apparatuses and security settings. The latter is an authentication scheme dedicated to a supplier. The WPS includes a push button scheme and a PIN code scheme. In the push button scheme, a parent apparatus (base apparatus) transmits the SSID or the ESSID and the encryption key to a child apparatus (extension apparatus) and sets the SSID or the ESSID and the encryption key. In the PIN code scheme, the child apparatus generates a password called a "PIN code" and inputs the password in the parent apparatus, and then, the parent apparatus transmits the SSID or the ESSID and the encryption key to the child apparatus and sets the SSID or the ESSID and the encryption key. By this setting, it becomes possible to connect.

In order to establish the above virtual network, for an example, a concept called a Software-Defined Network (SDN) and a tunneling protocol are used. Here, as long as the virtual network can be established, any other method may be alternatively employed. Herein, the description is made by assuming that those concepts and the protocol are used. The SDN is to define network operations by software description. The technical elements of the SDN includes software virtualization and "OpenFlow Switching".

Software virtualization refers to a technique to realize a flexible network configuration which is not limited by a physical configuration by virtually separating a physical network configuration from a logical network configuration based on the combination of physical network apparatuses, virtual network parts, and protocol techniques.

"OpenFlow Switching" refers to a technique to separate a control plane, which is parts of data analysis, transmission destination determination, and determination control, from a data plane which is a part that provides physical transmission of packet data, by recognizing the communication as a flow of end-to-end. In the technique, an OpenFlow Controller (OFC), which handles the processes of the control plane, instructs a transmission destination rule, and an OpenFlow Switch (OFS), which handles the processes of the data plane, performs transmission of packet data in accordance with the instruction from the OFC. In more detail, the OFC performs addition and rewrites to a flow table of the OFS, so that the OFS performs transmission of packet data in accordance with the flow table. By employing this scheme, it becomes possible to use it as a tool to control network virtualization.

Use of SDN related technologies have rapidly expanded in Web/Cloud centers where communication loads are concentrated, a backbone (large-capacity communication line network), etc. By flexibly optimizing control in this technique, it has become possible to increase efficiency in communication traffic and reduce cost and energy consumption, etc.

The tunneling protocol refers to a protocol to establish a single logical communication line that directly connects between two points on a network with a virtual communication path. As the tunneling protocol, it is possible to employ a protocol called, for example, "L2 over L3" or a protocol called "VXLAN", "NVGRE", or "STT". For example, in the "L2 over L3" protocol, a frame of the second layer (L2) in the OSI reference model as illustrated below is encapsulated in a packet of the third layer (L3) to be transmitted and received, so that the above two points can be directly connected. The protocol called, for example, "L2 over L3" includes "Point to Point Protocol (PPP) over Secure Shell (SSH)", "PPP over Ethernet (registered trademark) (PPPoE)", etc.

Figure 2:
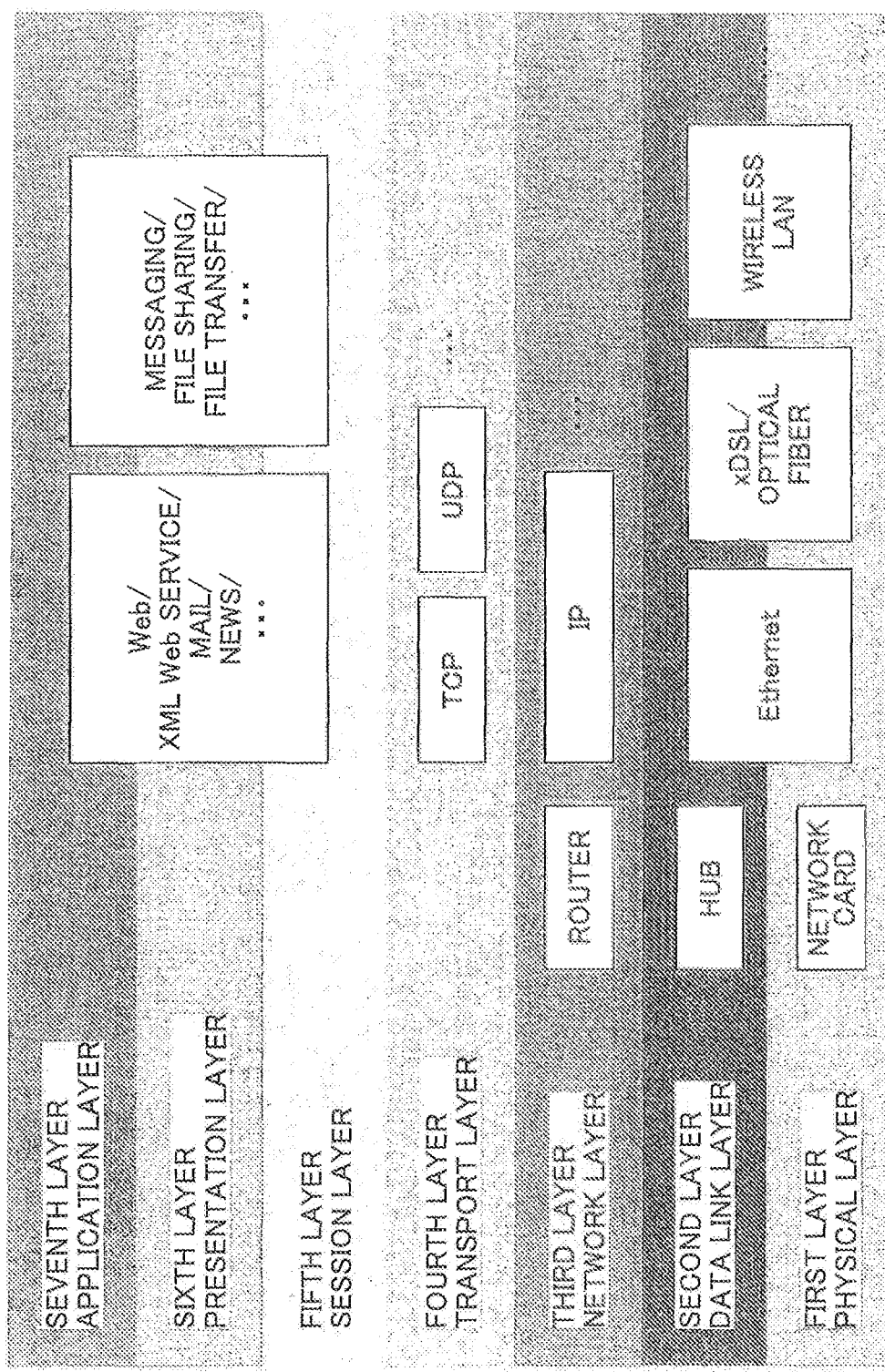
FIG. 2 is a drawing illustrating an example model where a communication function, which is implemented in the communication apparatus, is divided into a hierarchical structure.

The concept and the protocols of those are described in more detail below. However, before that, the communication function is described first which is implemented in the communication apparatus such as the electronic whiteboard 11, etc. FIG. 2 is a drawing exemplarily illustrating a model where the communication function is divided into a hierarchical structure. The model refers to the OSI reference model which includes seven layers from the physical layer as the first layer to the application layer as the seventh layer. Recently, as the communication scheme of exchanging IP packets, a horizontal division model has been generally used in which IP of the third layer is treated as a common asset, interfaces are defined in respective layers, and can be implemented or exchanged separately. An application on an IP packet basis establishes a session between communication peers by a concept of a port defined by the transport layer as the fourth layer.

As the services, there are Web, XML Web service, mail, messaging, file sharing, file transmission, etc as illustrated in the fifth through the seventh layers of FIG. 2. The application that provides these services is illustrated in the third and the fourth layers. As long as TCP/IP or UDP/IP is used, it is not necessary to be concerned about the lower communication layers of the first and the second layers. Due to this, it has become possible to develop Web and Cloud services faster than service development in a vertical integration model such as a conventional telephone switching network. Further, it becomes possible for the communication apparatus to have a general hardware/software configuration for developing a communication application on an IP packet basis as illustrated in FIG. 2.

Figure 3A:
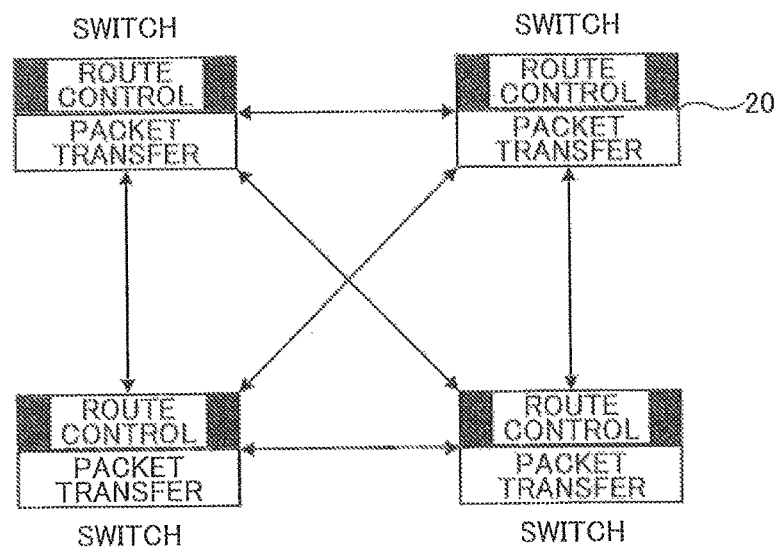
FIG. 3A is a drawing illustrating a conventional scheme in communications.

In the following, a concept of "OpenFlow Switching" which can be implemented in the communication apparatus is described. The IP packets, which are transmitted from the communication apparatus reach an object destination via a relay apparatus(es) in wired and wireless communications. In a conventional scheme, as illustrated in FIG. 3A, each of the relay apparatuses performs route control independently and dispersedly to determine the transfer destination. Namely, a switch 20 serving as a relay apparatus includes both the route control function and the packet transfer function, and performs both of the processes (functions). Due to this, the information related to the route control is learned by the switch 20 by itself and is not reported to any other switches, so that the information can be fixed. Further, as the functions of the switch 20, it is necessary to use various functions which have been developed by the developer of the apparatus, and it is not possible to customize the functions.

Figure 3B:
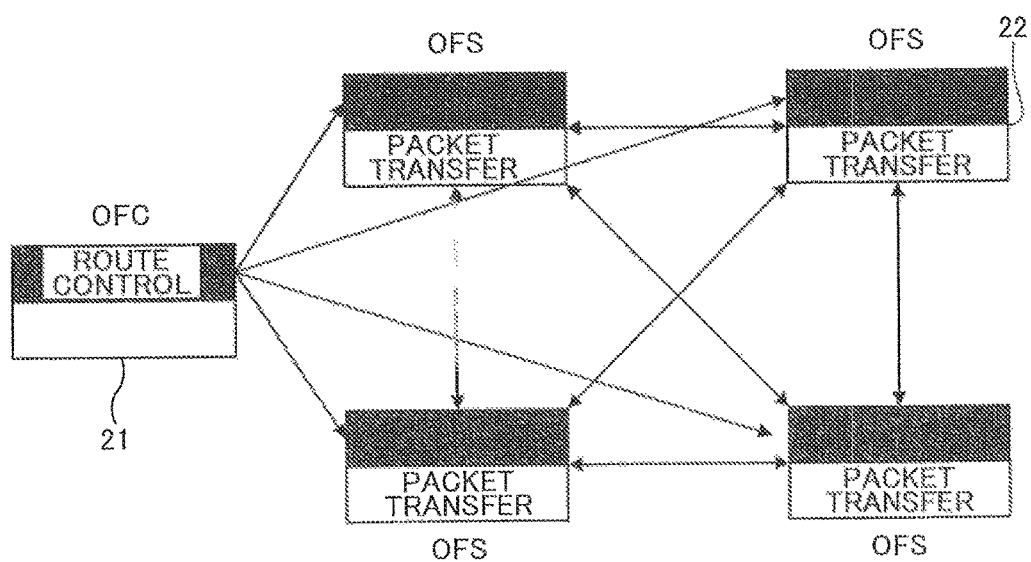
FIG. 3B is a drawings illustrating a concept of "OpenFlow Switching" that can be implemented in the communication apparatus.

On the other hand, in the "OpenFlow Switching", as illustrated in FIG. 3B, the route control function of the switch 20 is separated and is implemented in an OFC 21, so that only the packet transfer function is implemented in an OFS 22 which serves as the switch 20. All the information related to the route control is managed by the OFC 21, and the OFC 21 performs central control on behaviors of the OFSs 22, thereby enabling more flexible control performance.

When the OSI reference model of FIG. 2 is referred to, this indicates that it is possible to freely control the fourth layer with various conditions. Therefore, in a communication using TCP port 80 which is usually used in a HyperText Transfer Protocol (HTTP), it is also possible to change the route.

Next, a specific scheme, etc, of the "OpenFlow Switching" is described with reference to the conceptual drawing of FIG. 4. In this technique, as illustrated in FIG. 4A, one OFC 21 and a plurality of the OFS 22 and 23 are used. The OFC 21 is in charge of complicated processes such as route control, and the OFS 22 and 23 are in charge of simple processes such as frame transfer, the frame being a unit in transmitting data.

The OFC 21 instructs to add, delete, and change the information of a flow table which is owned by the OFS 22 and 23. The OFS 22 and 23 perform the frame transfer, etc., based on the information of the flow table.

As illustrated in FIG. 4E, the flow table includes a flow entry which indicates control rules of the frame. The flow table includes a constructional element, which identifies the flow entry, and three types of information, which are a condition, statistical information, and a process that correspond to the constructional element. The constructional element refers to a field "flow entry 1", "flow entry 2", etc., which distinguish one from another to be input. The condition refers to a header field and a field to which the information as illustrated in FIG. 4C is to be input to distinguish and identify the communication.

The statistical information refers to a field to manage how much of the communications adapted to the condition are generated and how much of the communications are processed. The process refers to a field to define the process to be performed on the frame. As the processes, there are transfer (Forward), put into a designated cue (Enqueue), discard (Drop), rewrite a value in a designated field (Modify-Field), etc. Further, it is possible to perform a designated process for a special group (Group), add/remove a tag (Push-Tag, Pop-Tag), etc. Also, it is possible to designate in more detail, and in the above transfer (transmissions), for example, to transfer (transmit) to all physical ports, encapsulate and transmit to a controller, etc.

As for the condition, there are, for example, the information of four layers (layers 1 through 4) and meta data as illustrated in FIG. 4C. As the information of layer 4, there is a physical port of the switch. As the information of layer 2, there is the MAC address of the destination, the MAC address of the transmission source, a type of the Ethernet (registered trademark), an ID of a virtual LAN (VLAN), and a priority degree of the virtual LAN. As the information of layer 3, there is the IP address of the destination, the IP address of the transmission source, the protocol No., a priority degree of the IP packets (ToS). As the information of layer 4, there is a transmission source TCP/IP port No. and a destination TCP/IP port No. Further, layers 2 and 3 may include Multi-protocol Label Switching (MPLS) and a MPLS traffic class to identify the next routing destination.

When instructing to add, etc., the information of a flow table, the OFC 21 instructs to transmit and receive packets by using the tunneling protocol, so that the OFS 22 and 23 can transmit and receive the packets based on the instruction. By doing this, the above virtual communication path can be formed and the virtual network can be established.

Figure 5:
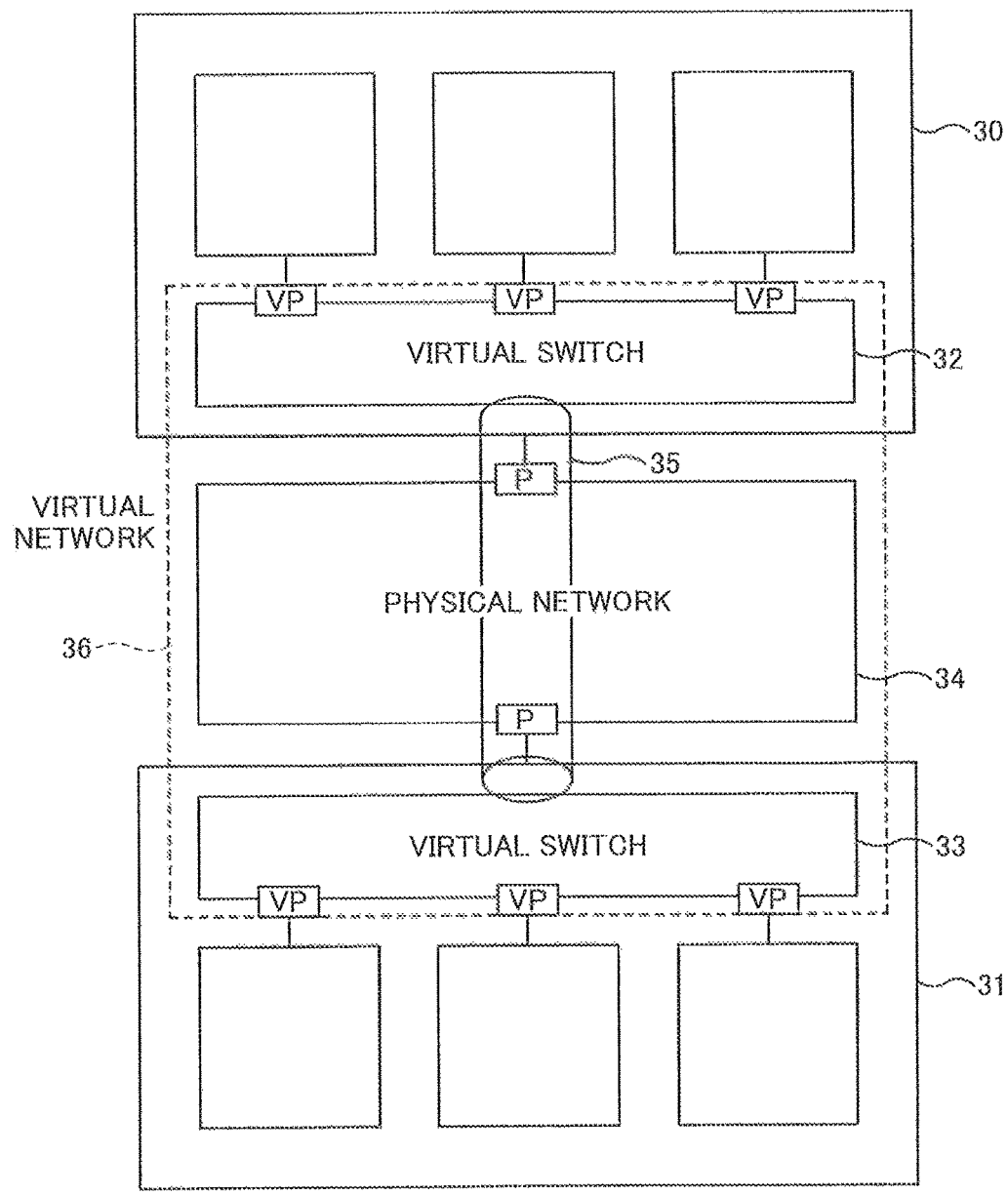
FIG. 5 is a drawing illustrating tunneling and a virtual network.

Next, tunneling is described with reference to FIG. 5. In FIG. 5, the communication apparatus and the other communication apparatus are referred to as nodes 30 and 31, and the nodes 30 and 31 includes virtual switches 32 and 33, respectively. The virtual switches 32 and 33 are connected to each other via a physical network 34 formed by a physical switch, an access point, etc.

By performing communications using the tunneling protocol, the virtual switch 32 and the virtual switches 33 form a virtual tunnel 35 which is a virtual communication path in the physical network 34. By the virtual tunnel 35, the virtual switch 32 and the virtual switches 33 are directly connected to each other to establish (form) a virtual network 36, which is like a Virtual Private Network (VPN) in the Internet.

The actual communications using the tunneling protocol is performed in a manner such that the transmission source encapsulates a packet or a frame, which is described in the protocol to be originally used for transmission, with a packet of another protocol, and transmits the packet or frame, and the transmission destination decapsulates the received capsule.

As described, by employing the "OpenFlow Switching", the OFC 21 performs the central control, so that in the case of user authentication, it becomes possible to easily permit a user's connection. Further, by using the tunneling protocol, it becomes possible to establish the virtual network 36 and limit the apparatuses in the virtual network 36 as the apparatuses that can be used by the guest who is permitted to connect. Namely, when the communication apparatus is the access point for a quest, by forming the virtual tunnel 35 to a specific apparatus(es) such as the electronic whiteboard 11, the MFP 12, etc., to establish the virtual network 36, it becomes possible to limit the access range for the guest in the usual network. Due to this, it becomes possible for a guest to access usable apparatuses on the usual network from the apparatus and use the usable apparatuses.

The access point(s) and the apparatus(es) that can be used by a guest can be set by an Inviter who invites the guest by accessing a control apparatus (controller) having the OFC 21 from a registered communication apparatus owned by the inviter and registering the access point(s) and the apparatus(es).

Figure 6:
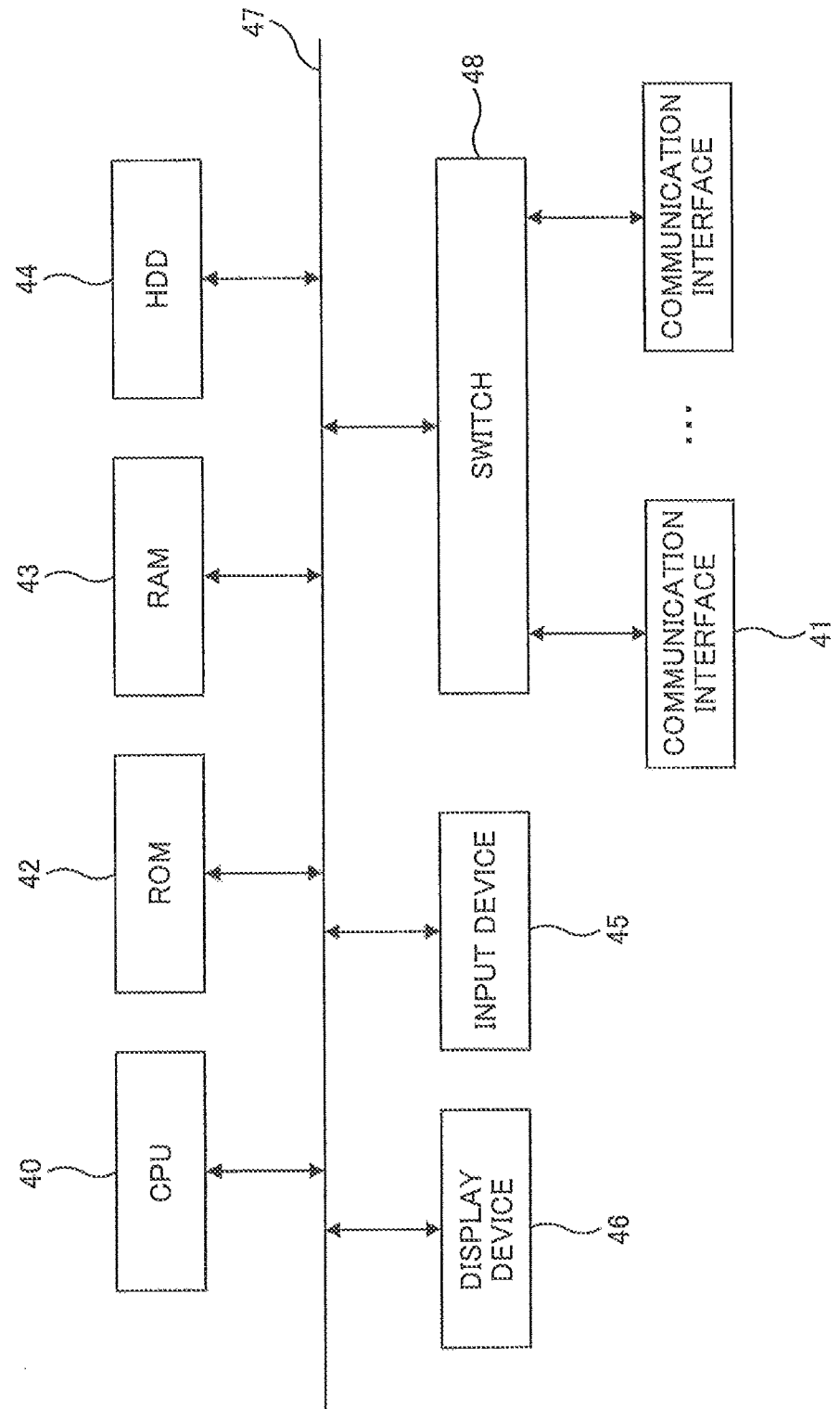
FIG. 6 is a drawing illustrating a hardware configuration of the communication apparatus of FIG. 1.

The communication apparatus has a hardware configuration as illustrated in FIG. 6. The hardware configuration includes only main hardware elements. Therefore, because the functions vary depending on the apparatus, it is possible to add more hardware elements based on the functions. Further, one or more other communication apparatuses are similar to the communication apparatus, Therefore, herein, only the communication apparatus is described.

The communication apparatus includes a CPU 40 to control the entire communication apparatus, storage devices to store a program to be loaded by the CPU 40, and one or more communication interfaces 41 to perform wired and wireless communications with the other communication apparatuses. FIG. 6 illustrates a case where a plurality of the communication interfaces 41 are included. The communication interfaces 41 may be, for example, a transmission/receiving module including a transmitter and a receiver to transmit and receive packets, a communication connector to connect to a wired LAN, etc.

The storage devices include a ROM 42 for reading only, a RAM 43 which provide a working area when the CPU 40 performs various processes, and an HDD 44 to store the application, various data, etc. Here the HDD 44 is used. However, alternatively, a Solid State Drive (SSD) may be used. Further, the communication apparatus may include an input device 45 such as an input button, an operation panel, etc., and a display device 46. The communication apparatus further includes a bus 47 to mutually connect those devices and a switch 48, which is provided between the bus 47 and the one or more communication interfaces 41, serving as a selection means.

The communication apparatus performs communications with a controller (not shown), which controls communications, by using one of the one or more communication interfaces 41, and receives an instruction related to the communication path from the controller. The instruction is received by the CPU 40, the CPU 40 determines the communication interface 41 to be used to transmit packets based on the instruction, and notifies the switch 48 of the determined communication interface 41, so that the communication interface 41 selects the notified communication interface 41. In this case, the controller further notifies other communication apparatuses which is the communication counter parts, so as to cause the other communication apparatuses to select the communication interface that provides the same communication path.

When being instructed from the controller to perform communications with the other communication apparatus by using the tunneling protocol, the communication apparatus performs communications by using the tunneling protocol. In the communications, packets are transmitted and received. In the communication apparatus, the CPU 40 reads a predetermined program from the HDD 44, and generates packets to be transmitted. Further, the CPU 40 performs a predetermined process on the received packets. As an example of such processes, there are processes of receiving packets to display a screen and displaying the screen based on the packets.

The number of the communication interfaces 41 may be one or two or more. The communication interface 41 may be a physical interface including a communication connector and a software driver. Otherwise, the communication interface 41 may be a virtual physical interface which pretends to be seen as two or more physical interfaces, or may be two or more virtual physical interfaces which pretend to be seen as a single physical interface. As the switch 48, a physical switch to physically switch the transmission destinations and the reception source of the packets may be used. Otherwise, as the switch 48, it is also possible to use a virtual switch that handles one physical switch as plural switches or a virtual switch that handles plural physical switches a single physical switch.

The access points 13 and 14 which are used as the communication apparatus or the other communication apparatus may include the switch 48. Otherwise, a switch as a separate device may be directly connected to the access points 13 and 14. Here, it is preferable that the switch is the OFS because it becomes possible to perform SDN control at the edge, which makes it possible to perform the most natural control. However, it is possible to change the apparatus having the OFS and the position of the apparatus depending on the purpose.

Figure 7:
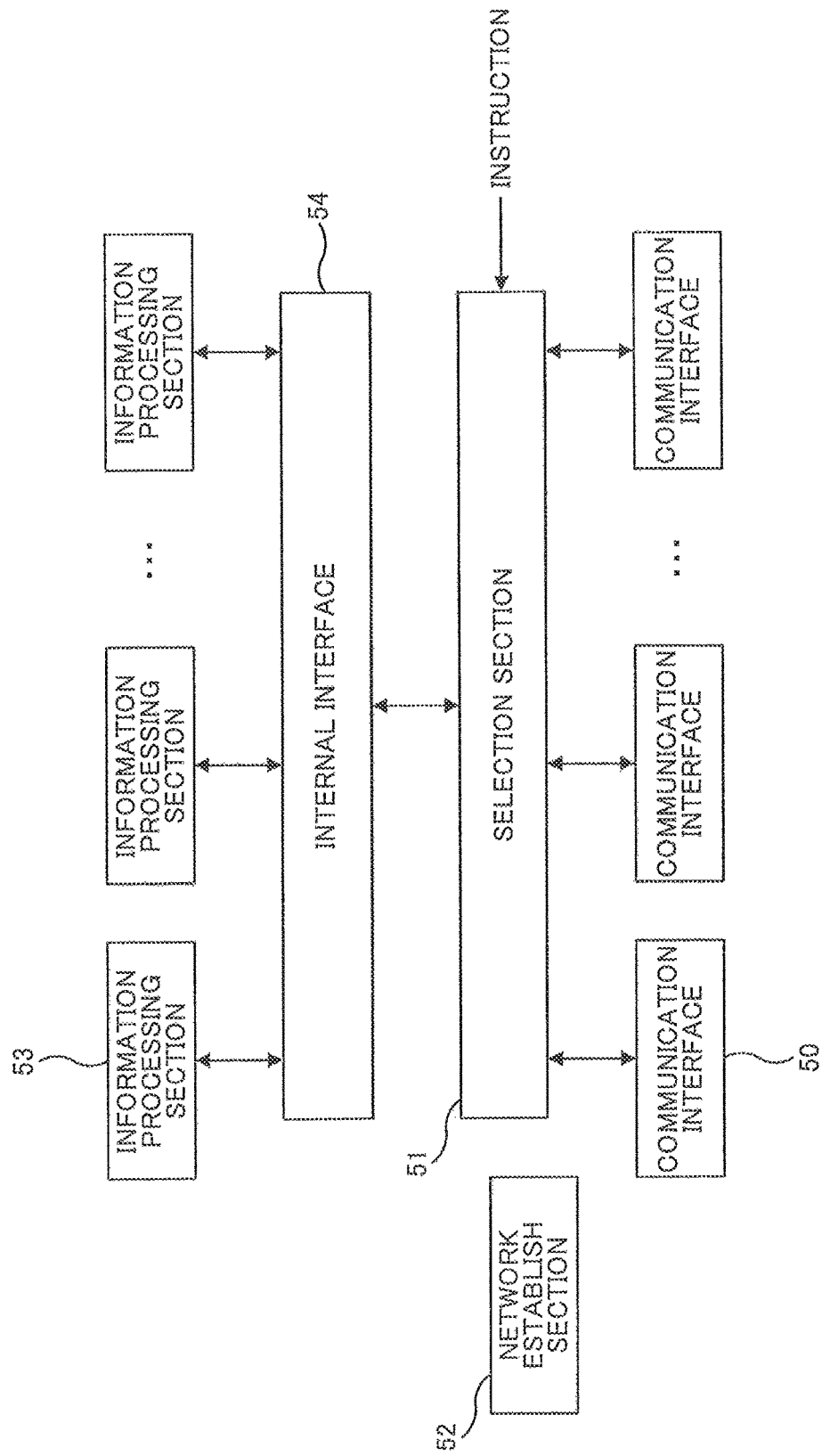
FIG. 7 is a functional block diagram of the communication apparatus of FIG. 1.

In order to realize such functions, the communication apparatus may include a function section as illustrated in FIG. 7. The communication apparatus is connected to one or more communication interfaces 50 and includes a selection section 51 to select the communication interface to be used in accordance with the instruction from the controller which controls communications. As the communication interfaces 50, all the communication interfaces 50 may be physical interfaces or some of the communication interfaces 50 may be virtual interfaces. Preferably, the selection section 51 be an OFS switch. Also, preferably, the controls include the OFC. The OFC can be provided in the controller which is outside of the communication apparatus. However, the OFC may be implemented in the communication apparatus. When being implemented in the communication apparatus, the OFC may be implemented as an OFC program, etc.

The communication apparatus includes a network establish section 52 that establishes a virtual network by forming a virtual communication path to directly connect the communication interface 50, which is selected by the selection section 51, with the communication interface which is included in one of the one or more other communication apparatuses. The network establish section 32 forms a virtual tunnel which is the virtual communication path directly connecting the communication interface to each other by causing the communication apparatus to communicate with the other communication apparatus by using the tunneling protocol described above.

The OFC can issue an instruction based on the information which is related to any communication path set by the inviter who invites a guest. Further, the OFC can issue an instruction based on acquired information which is related to the communication path that can be used by the communication apparatus and the other communication apparatus that perform communications. For example, in the environment where Bluetooth (registered trademark) can be used, it is possible to acquire such information as the information related to the usable communication path.

The communication apparatus may include one or more information processing sections 53 which are not always necessary as the function section of the communication apparatus. The information processing section 53 generates packets to be transmitted to the other communication apparatus, and outputs the packets to an internal interface 54. Further, the information processing section 53 receives packets from the other communication apparatus, and performs a predetermined process on an as needed basis. For example, in a case where packets refers to a request to display screen data, upon receiving the packets, the information processing section 53 performs a process to display the screen data. The internal interface 54 is connected to one or more information processing sections 53 and the selection section 51, and transfers the packets, which are output by the one or more information processing sections 53, to the selection section 51. Further, the internal interface 54 transfers the packets, which are received by the communication interface 50, to a predetermined information processing section 53.

Figure 8:
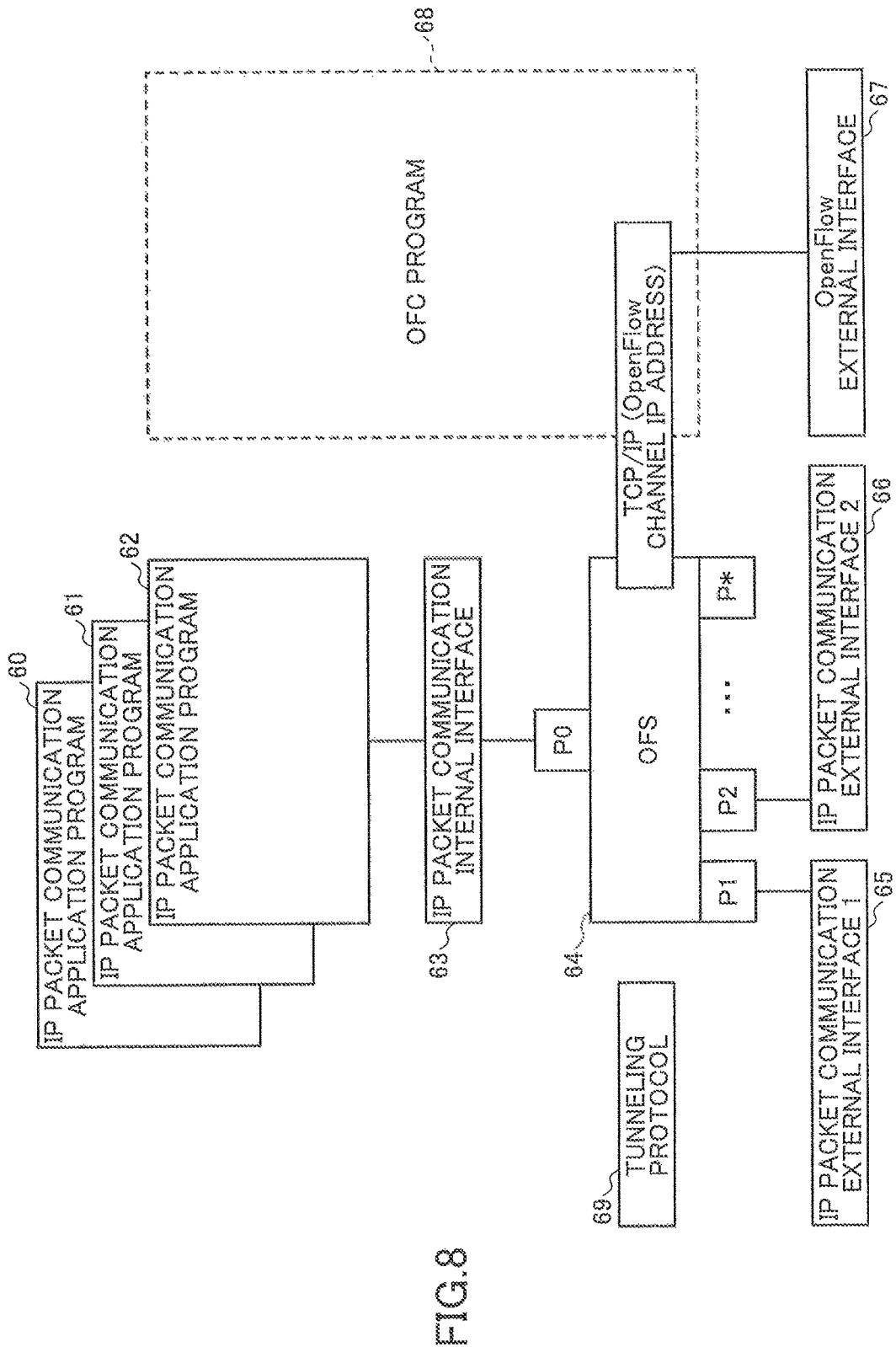
FIG. 8 is a drawing illustrating a specific implementation example of the communication apparatus.

FIG. 8 illustrates a specific implementation example of the communication apparatus. The applications that provide main functions in the communication apparatus are IP packet communication application programs 60 through 62, which are realized in the third layer or higher in the OSI reference model of FIG. 2. The IP packet communication application programs 60 through 62 can generate and output packets in accordance with the service to be provided, and also can receive packets and perform a predetermined process on the packets. In FIG. 8. A case is described where there are three IP packet communication application programs 60 through 62. However, note that the number of the IP packet communication application programs may be one, two, or four or more in accordance with the services to be provided.

The IP packet communication application programs 60 through 62 have an IP address for external communications to be used to communicate with the other communication apparatus. The IP packet communication application programs 60 through 62 are connected to an IP packet communication internal interface 63 which corresponds to the second layer or lower, and performs data communications by using the IP packet communication internal interface 63.

The IP packet communication internal interface 63 is connected to the port P0 of the OFS 64 which functions as the selection section 51 of FIG. 7. The other ports P1 and P2 are connected to IP packet communication external interfaces 65 and 66, respectively. In FIG. 8, there are n (n: an integer greater than two) other ports P1 through P* are provided.

The communication apparatus includes an OpenFlow external interface 67 which is dedicated to perform communications with the OFC which is the control apparatus. The OpenFlow external interface 67 is also called an "OpenFlow channel" In the OpenFlow channel, the communications in TCP/IP, which are separated from the data path where the communications for main functions are performed, is necessary. Therefore, generally, a different IP address becomes necessary. As the IP address, it is possible to use a global address or a local address, such as, for example, "192,168,0,1", which is adequately assigned by the DHCP, etc. Further, a local address in IPv6 may be used. When the OFC operates in the communication apparatus, an internal loopback address such as, for example, "127.0.0.1" can be used.

When no OFC exists, it is possible to operate an OFC program 68 (shown in dotted lines) which is a module having corresponding functions of the OFC. The OFC program 68 is not necessary when the OFC to control the whole system exists. When the OFC program 68 is operated, the IP address for the OpenFlow channel and the OpenFlow external interface 67 are used by the OFC program 68.

All the interfaces and the switches may be physical interfaces and physical switches, respectively, as described above. However, note that some of the interfaces and the switches may be virtual interfaces and virtual switches, respectively. In light of the cost, it is desirable that inexpensive virtual interfaces and virtual switches be used as some of the interfaces and the switches, respectively. Further, in order to enhance the communication performance, a data plane part may be with hardware acceleration.

In a case of an option board where the IP packet communication application programs 60 through 62 are IP connected to the OFC program 68 via the IP packet communication internal interface 63, the IP packet communication internal interface 63 is provided as a physical interface. The switches may have a function to convert a local IP address into a global IP address such as a Network Address Translation (NAT) router.

Note that it is not always necessary that the IP packet communication external interfaces 65 and 66 are physical interfaces, respectively. For example, the IP packet communication external interfaces 65 and 66 may have a structure where two interfaces can be logically operated on a single physical interface, which is called a "virtual MAC".

In the communication apparatus, a tunneling protocol 69 is implemented. The communication apparatus performs communication by using the tunneling protocol 69, and forma a virtual tunnel to directly connect one of the IP packet communication external interfaces 65 and 66 to an IP packet communication external interface of an apparatus at the other end. By doing this, the communication apparatus establishes the virtual network in a manner such that the virtual network overlays the usual network.

FIG. 8 illustrates a case where the OpenFlow external interface 67 is additionally provided to the IP packet communication external interfaces 65 and 66. Note that, however, the OpenFlow external interface 67 may not be provided separately. By forming a virtual tunnel by using any one of the IP packet communication external interfaces 65 and 66 and passing the OpenFlow channel to the OFC in the virtual tunnel, it becomes possible to be used as a data communication path and a control communication path of the OpenFlow channel.

Figure 9:
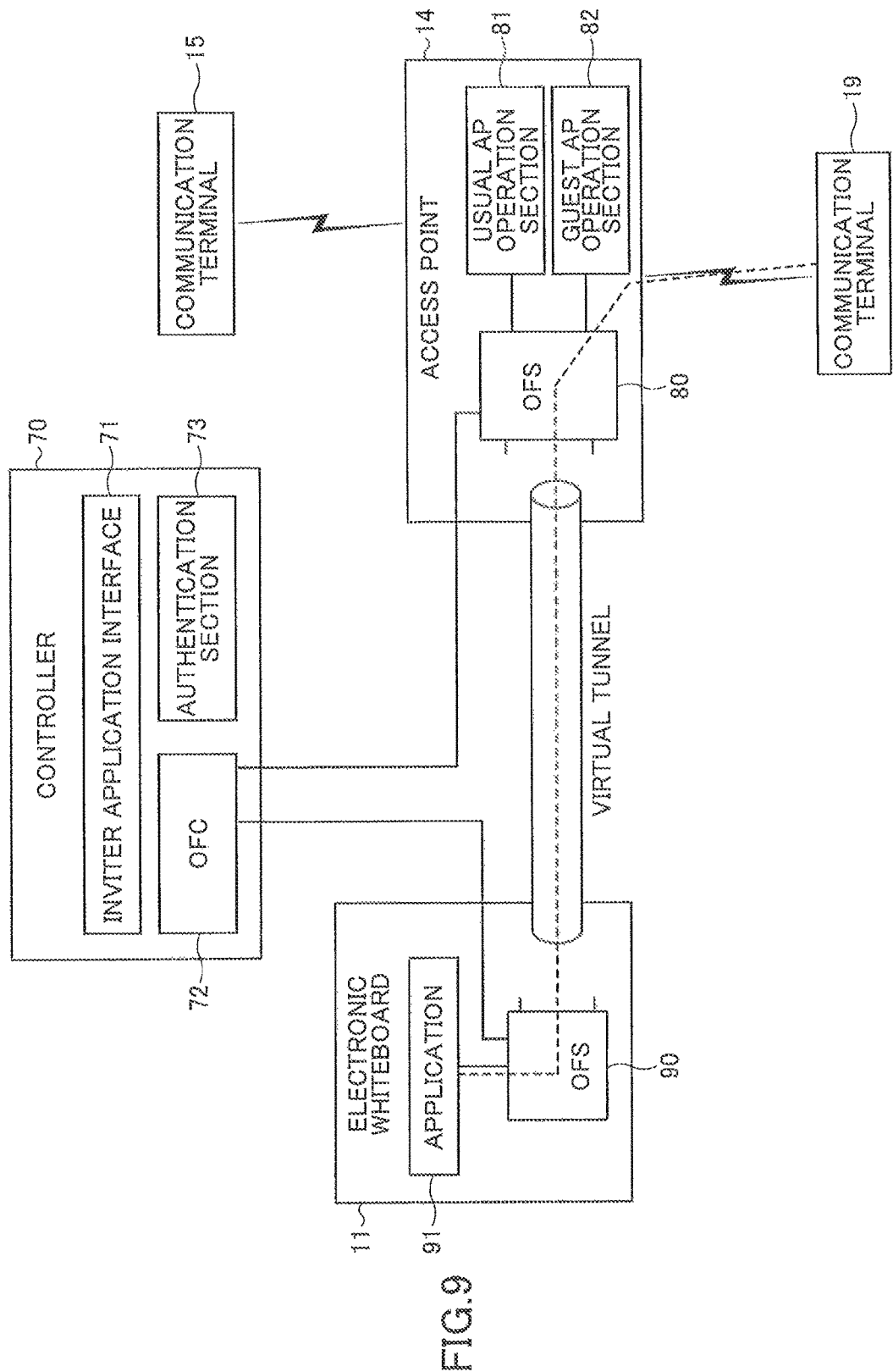
FIG. 9 is a drawing illustrating an example operation of apparatuses in the communication system.

With reference to FIG. 9, a procedure is described from a step of actually connecting the communication apparatus to a wireless LAN by a user to a step of using the electronic whiteboard 11 as the other communication apparatus. The guest has the communication terminal 19 and the inviter who invites the guest has the communication terminal 15. The authentication information, etc., of the communication terminal 15 is already registered, so that the communication terminal 15 can access a controller 70 and the electronic whiteboard 11 via the access point 14. On the other hand, the authentication information, etc., of the communication terminal 19 is not registered, so that, usually, the communication terminal 19 cannot access the access point 14 and the electronic whiteboard 11.

The controller 70 includes an inviter application interface 71 for the inviter, an OFC 72, and an authentication section 73. The inviter application interface 71 for the inviter is used by the inviter to set the permission for the guest's connection to the wireless LAN and traffic path. The inviter uses the communication terminal 15 to access the controller 70 via the access point 14 and uses the inviter application interface 71 for the inviter to perform the settings. For example, it is possible to set which of the access points is permitted to be used by the guest and which of the apparatuses is permitted to be accessed by the user, etc.

The authentication section 73 stores information related to the authentication information and the authentication scheme in usual access point (AP) 14 operations and AP operations for the guest, and performs an authentication process based on the information.

The access point 14 includes an OFS 80, a usual AP operation section 81, and a guest AP operation section 82 which is operated as a switch to the AP operation for a guest. The electronic whiteboard 11 includes an OFS 90, and an application 91 to realize the functions of the electronic whiteboard 11.

In the case of the above push button scheme, the inviter transmits the SSID, the encryption key, etc, which are to be used to access the access point 14 permitted by the inviter, to the communication terminal 19 of the guest to be set by the guest. The communication terminal 19 uses the set information and connects to the access point as, for example, a "guest". The information is transmitted to the controller 70 via the access point 14, and the controller 70 transmits the information to the communication terminal 15 via the access point 14. The controller 70 operates in cooperation with the communication terminal 15 so that communication in the communication range in which accesses are permitted by the inviter, including the use of the electronic whiteboard 11, can be permitted. To that end, the inviter using the communication terminal 15 sets the range in which the guest can use apparatuses.

The OFC 72 of the controller 70 starts up the guest AP operation section 82 of the access point 14, sets the information in the flow table, and causes the OFS 80 to start its operation to switch so that the access point 14 is a guest AP. For example, as the information in this case, there is the information indicating that the packets from the guest are transferred to the electronic whiteboard 11 by using the tunneling protocol. Note that this information is an example only. Namely, the information is not limited to this information. Further, the OFC 72 sets the information in its flow table about the electronic whiteboard 11, For example, the set information is the information indicating that the packets from the guest are transferred to a display section. By doing this, it becomes possible to establish a virtual network in a manner such that the virtual network overlays the usual network and transmits packets from the communication terminal 19 to the electronic whiteboard 11 via the virtual network, so that the desired functions can be used.

There are many cases including, for example, a case where it is possible to limit only by OFS in the access point, a case where it is necessary to control access communication up to OFS of the electronic whiteboard 11, a case where tunneling is used, and a case where tunneling is not used. As an example of the case where it is possible to limit only by OFS, there is a case where all are connected wirelessly. As an example of the case where it is necessary to control up to OFS of the electronic whiteboard 11, there is a case where two apparatuses exist in the same segment. Here, the term "segment" refers to a network range in which data do not pass through a router.

The controller 70 performs programming on a case basis, and executes the program corresponding to the case to perform access control, etc.

FIG. 10 is a flowchart of a process in the access point 14 as the communication apparatus in this case. In step S1000, the process starts. In step S1005, the access point 14 receives a connection request from the communication terminal 19 of a guest. For example, the request is a request for the connection as a guest.

In step S1010, the access point 14 receives the connection request, and transfers the connection request to the controller. In step S11015, the access point 14 receives an instruction from the controller 70, and transfers the connection request to the communication terminal 15 of the inviter. The controller operates with the communication terminal of the inviter to permit the connection and receive information of the apparatuses that can be used. The access point 14 transfers the information From the communication terminal 15 to the controller 70.

In step S1020, the access point 14 receives a notice of the connection permission from the controller 70, and notifies the communication terminal 19 that the connection is successful. In step S1025, the access point 14 receives instructions from the controller 70 so as to perform guest AP operations. In step S1030, the access point 14 starts the guest AP operations in accordance with the instructions. The OFS 80 starts operations as a switch to the guest AP.

In step S1035, the access point 14 receives packets from the communication terminal 19. In step S1040, in accordance with the flow table, the access point 14 selects a communication interface to be used. In step S1045, the access point 14 forms a virtual tunnel to the electronic whiteboard 11 by using the tunneling protocol, and establishes a virtual network, so that packets can be transmitted via the established virtual network.

The electronic whiteboard 11 processes the packets, and, when there are packets to be transmitted to the communication terminal 19, transmits the packets to the access point 14 via the virtual network, so that the access point 14 transmits the packets to the communication terminal 19 using wireless communications.

In step S1050, it is determined whether an instruction to return to the usual AP operation is received from the controller 70. Until the instruction is received, the access point 14 continues to operation as the guest AP. Upon receiving the instruction, the process goes to step S1055, where the operation of the access point 14 is returned to the usual AP operation. In step S1060, the process ends. Note that, the process described herein is an example only, and the present invention is not limited to the process.

As described above, by establishing the virtual network on the usual network, it is no longer necessary to set a network for a guest in advance, and it becomes possible to improve the use efficiency of the guest network. Further, it is possible to easily limit and add the apparatuses to be used in the virtual network, it becomes possible to flexibly realize a response in accordance with a guest.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

The present application is based on and claims the benefit of priority of Japanese Patent Application Nos. 2014-114860 filed Jun. 3, 2014 and 2014-258316 filed Dec. 22, 2014, the entire contents of which are hereby incorporated herein by reference.

DESCRIPTION OF THE REFERENCE NUMERALS

10: WIRED LAN
11: ELECTRONIC WHITEBOARD
12: MFP
13, 14: ACCESS POINT
15: COMMUNICATION TERMINAL
16: PROJECTOR
17: FIREWALL
18: THE INTERNET
19: COMMUNICATION TERMINAL
20: SWITCH
21: OFC
22, 23: OFS
30, 31: NODE
32, 33: VIRTUAL SWITCH
34: PHYSICAL NETWORK
35: VIRTUAL TUNNEL
36: VIRTUAL NETWORK
40: CPU
41: COMMUNICATION INTERFACE
42: ROM
43: RAM
44: HDD
45: INPUT DEVICE
46: DISPLAY DEVICE
47: BUS
48: SWITCH
50: COMMUNICATION INTERFACE
51: SELECTION SECTION
52: NETWORK ESTABLISH SECTION
53: INFORMATION PROCESSING SECTION
54: INTERNAL INTERFACE
60-62: IP PACKET COMMUNICATION APPLICATION PROGRAM
63: IP PACKET COMMUNICATION INTERNAL INTERFACE
64: OFS
65, 66: IP PACKET COMMUNICATION EXTERNAL INTERFACE
67: OPENFLOW EXTERNAL INTERFACE
68: OFC PROGRAM
69: TUNNELING PROTOCOL
70: CONTROLLER
71: INVITER APPLICATION INTERFACE
72: OFC
73: AUTHENTICATION SECTION
80: OFS
81: USUAL AP OPERATION SECTION
82: GUEST AP OPERATION SECTION
90: OFS
91: APPLICATION

PRIOR ART DOCUMENTS

Non-Patent Document

[Non-Patent Document 1] "Why not study network? Cisco CCNA/CCNP/CCIE, best to study for the network specialist test—wireless LAN, a scheme of wireless LAN part 3", [on-line], Aug. 4, 2007 [searched Mar. 10, 2014], the Internet <URL: http//www.n-studycom/network/2007/08/lan_lan_3_1.html>

The invention claimed is:

1. A communication apparatus in a system which includes one or more other communication apparatuses registered with the communication apparatus to communicate via an already-established network with the communication apparatus, comprising:
   one or more communication interfaces configured to be used for communication with the one or more other communication apparatuses;
   a selection unit that is connected to the one or more communication interfaces and is configured to select at least one communication interface that is to be used in accordance with an instruction from a control device which controls communications; and
   a network establish unit configured to establish, upon receiving from a guest terminal, which is not registered with the communication apparatus, a request to access another communication apparatus amongst the one or more other communication apparatuses, a virtual network, overlaying the already-established network, including forming a virtual communication path by setting the selected communication interface of the communication apparatus to directly connect and communicate via a tunneling protocol with a counterpart communication interface, set correspondingly as a virtual interface, of said another communication apparatus.

2. The communication apparatus according to claim 1, wherein the tunneling protocol is an L2 over L3 protocol.

3. The communication apparatus according to claim 1, wherein some of the plural communication interfaces are virtual interfaces.

4. The communication apparatus according to claim 1, wherein the selection unit is a physical switch or a virtual switch.

5. The communication apparatus according to claim 1, wherein the control device includes an OpenFlow controller used in an OpenFlow Switching technique, and the selection unit is an OpenFlow switch.

6. The communication apparatus according to claim 5, further comprising:
a control unit configured to provide an instruction to select the at least one communication interface for the selection unit when the control device does not include the OpenFlow controller.

7. A communication system comprising:
a communication apparatus; and
one or more other communication apparatuses registered with the communication apparatus to communicate with the communication apparatus via an already-established network,
wherein the communication apparatus includes
one or more communication interfaces configured to be used for communication with the one or more other communication apparatuses;
a selection unit that is connected to the one or more communication interfaces and is configured to select at least one communication interface that is to be used in accordance with an instruction from a control device which controls communications; and
a network establish unit configured to establish, upon receiving from a guest terminal, which is not registered with the communication apparatus, a request to access another communication apparatus amongst the one or more other communication apparatuses, a virtual network, overlaying the already-established network, including forming a virtual communication path by setting the selected communication interface of the communication apparatus to directly connect and communicate via a tunneling protocol with a counterpart communication interface, set correspondingly as a virtual interface, of said another communication apparatus.

8. A communication method to be executed by a communication apparatus in a system which includes one or more other communication apparatuses registered with the communication apparatus to communicate via an already-established network with the communication apparatus, the communication apparatus including one or more communication interfaces to perform communications with the one or more other communication apparatuses, the method comprising:
(a) selecting at least one communication interface that is to be used amongst one or more communication interfaces of the communication apparatus, in accordance with an instruction from a control device which controls communications;
(b) receiving from a guest terminal, which is not registered with the communication apparatus, a request to access another communication apparatus amongst the one or more other communication apparatuses; and
(c) establishing, upon receiving the request from the guest terminal, a virtual network, overlaying the already-established network, including forming a virtual communication path by setting the selected communication interface of the communication apparatus to directly connect and communicate via a tunneling protocol with a counterpart communication interface, set correspondingly as a virtual interface, of said another communication apparatus.

9. The communication system according to claim 7, wherein some of the plural communication interfaces are virtual interfaces.

10. The communication apparatus according to claim 1, wherein the tunneling protocol is an L2 over L3 protocol, wherein some of the plural communication interfaces are virtual interfaces.

11. The communication system according to claim 7, wherein the selection unit is a physical switch or a virtual switch.

12. The communication apparatus according to claim 1, wherein the tunneling protocol is an L2 over L3 protocol, wherein the selection unit is a physical switch or a virtual switch.

13. The communication apparatus according to claim 1, wherein some of the plural communication interfaces are virtual interfaces,
wherein the selection unit is a physical switch or a virtual switch.

14. The communication system according to claim 7, wherein some of the plural communication interfaces are virtual interfaces,
wherein the selection unit is a physical switch or a virtual switch.

15. The communication apparatus according to claim 1, wherein the tunneling protocol is an L2 over L3 protocol, wherein some of the plural communication interfaces are virtual interfaces,
wherein the selection unit is a physical switch or a virtual switch.

16. The communication system according to claim 7, wherein the control device includes an OpenFlow controller used in an OpenFlow Switching technique, and the selection unit is an OpenFlow switch.

17. The communication apparatus according to claim 1, wherein the tunneling protocol is an L2 over L3 protocol, wherein the control device includes an OpenFlow controller used in an OpenFlow Switching technique, and the selection unit is an OpenFlow switch.

18. The communication apparatus according to claim 1, wherein some of the plural communication interfaces are virtual interfaces,
wherein the control device includes an OpenFlow controller used in an OpenFlow Switching technique, and the selection unit is an OpenFlow switch.

19. The communication apparatus according to claim 1, wherein the selection unit is a physical switch or a virtual switch,
wherein the control device includes an OpenFlow controller used in an OpenFlow Switching technique, and the selection unit is an OpenFlow switch.

* * * * *